W. CRICHTON.
Rotary-Cultivator.
No. 5,340.
Patented Oct. 23, 1847.
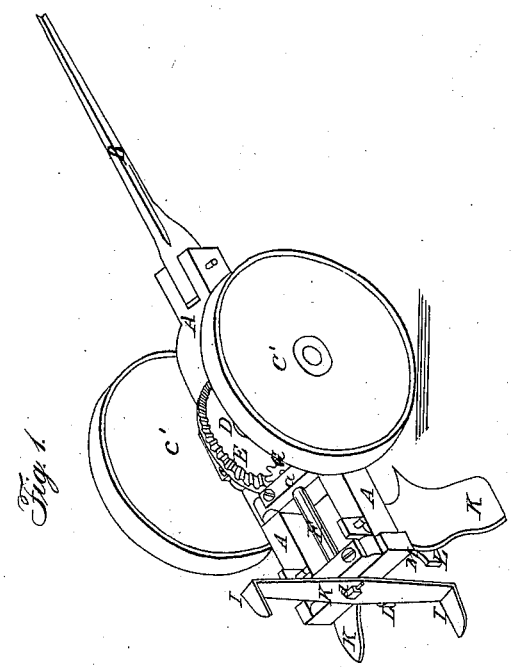
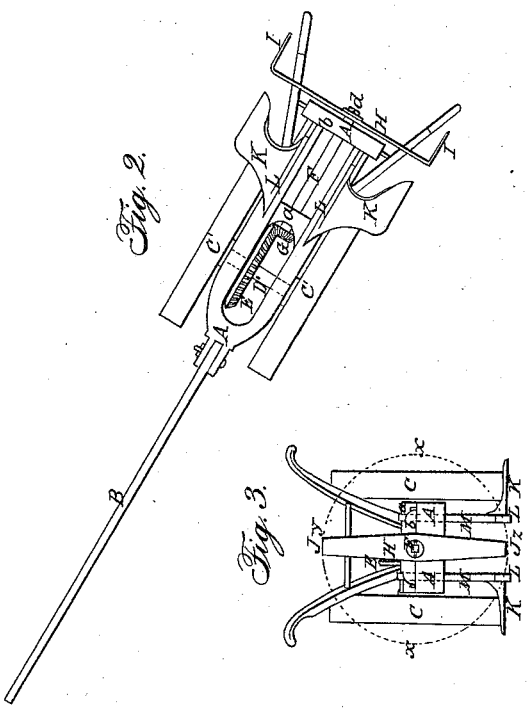
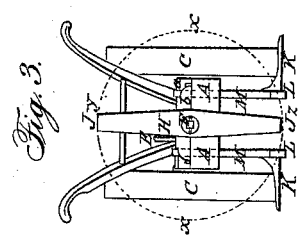

UNITED STATES PATENT OFFICE.

WINFIELD CRICHTON, OF DIAMOND GROVE, VIRGINIA.

IMPROVEMENT IN COTTON-THINNING PLOWS.

Specification forming part of Letters Patent No. 5,340, dated October 23, 1847.

*To all whom it may concern:*

Be it known that I, WINFIELD CRICHTON, of Diamond Grove, in the county of Brunswick and State of Virginia, have invented a new and Improved Cotton-Thinning Plow; and I do hereby declare that the following is a full and exact description.

The nature of my invention consists in the construction of a cotton-thinning plow, by which a cotton field may be cleaned and thinned and regularly divided in hills, as desired, by one operation of said plow, avoiding the troublesome and expensive slow mode of doing it by hands and the hoe.

To enable others skilled in the art to make and use my invention, I will proceed to describe its construction and operation, reference being had to the annexed drawings, making a part of this specification, in which—

Figure 1 is a perspective view of the cotton-thinning plow; Fig. 2, the plow viewed from below; Fig. 3, a view from behind or the handle side.

In Fig. 1, A is a strong frame of wood or iron; B, the tongue or pole; C C, two cast-iron driving-wheels; D, an iron axle, to which the wheels C C are stationarily fixed; E, a bevel-geared wheel fixed at the axle D; F, another iron axle, running in the center of the frame A back from and in a right angle with the axle D, and is kept in its proper position by the cross framework $a$ and $b$; G, a small bevel-wheel fixed at the axle F and meshing in the gearing of the wheel E; H, a flat plate of iron or steel fastened through a square hole upon the pinion $d$ of the axle F at its extreme end, projecting at the outside in the rear of the frame A; I I, knives or cutters fixed at each extremity of the flat plate H, making a right angle with said plate and pointing backward; K, the plowshares; L, the bar; M, the landside-plate of the plow.

The operation of the said cotton-thinning plow is as follows, viz: After the plow is set in motion the driving-wheels C C will revolve with their common axle D. The bevel-geared wheel E, being fixed on the axle D, sets in motion by the wheel G the longitudinal axle F. The plate H in being fixed to the axle F will revolve also, and carry round in a circle, as shown by the dotted lines $x\,x$, Fig. 3, and in a transverse direction from the line the plow is progressing, the knives or cutters I I. The knife I $z$ in revolving and turning the ground will cut or remove the plants in its way corresponding with the length of the knife, and leaving the plants undisturbed in the progress of the plow till the other knife should touch the ground also by the joint operation of the double plows K K and the said knives I $y$ I $z$, the former cutting the plants out in a longitudinal direction in proper rows, the plowshares being of the desired width, and the other cutting transversely, forming at once a cotton-field, in hills or patches of plants, in the most regular and perfect manner.

The trouble and expense attending the thinning of cotton-plants by hands and the hoe is too well known, then, to need to be described. My cotton-thinning plow will save three-fourths of the labor and expenses, and the regularity in its performance cannot be surpassed.

The plowshares are cast of iron at a time in one solid piece, the share, point, landside plate and bar, &c., all in one mass. The blades or cutters, being placed behind the driving-axle and outside of the frame, meet with fewer obstacles, as the hoes leave but a narrow side to cut, and that broken on each side.

The blades can be altered to suit the planter—lengthened or shortened—without altering the frame of the plow. The blades on approaching a thin piece of cotton can be raised by the handles, so as to avoid cutting up the cotton or hitting a stump.

What I claim as my invention, and desire to secure by Letters Patent, is—

Placing the cutter in rear of the driving-axle and plows and outside of the frame, as herein described and set forth.

WINFIELD CRICHTON.

Witnesses:
JAMES M. WORTHINGTON,
WM. RANEY.